United States Patent
Al Shammari

(10) Patent No.: US 12,492,775 B2
(45) Date of Patent: Dec. 9, 2025

(54) TEMPORARY TRAP DOOR CAP

(71) Applicant: SAUDI ARABIAN OIL COMPANY, Dhahran (SA)

(72) Inventor: Mohammed N Al Shammari, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 457 days.

(21) Appl. No.: 18/317,737

(22) Filed: May 15, 2023

(65) Prior Publication Data

US 2023/0279981 A1    Sep. 7, 2023

Related U.S. Application Data

(62) Division of application No. 17/016,892, filed on Sep. 10, 2020, now Pat. No. 11,686,416.

(51) Int. Cl.
*F16L 55/115*    (2006.01)
*F16J 13/02*    (2006.01)
*F16L 55/46*    (2006.01)

(52) U.S. Cl.
CPC ............ *F16L 55/115* (2013.01); *F16J 13/02* (2013.01); *F16L 55/1152* (2013.01); *F16L 55/46* (2013.01)

(58) Field of Classification Search
CPC .... F16J 13/02; F16J 13/06; F16J 13/10; F16J 13/14; F16J 13/16; F16J 13/18; F16J 13/24; F16L 55/115; F16L 55/1152
USPC .................. 220/256.1, 259.1, 328
See application file for complete search history.

(56) References Cited

U.S. PATENT DOCUMENTS

| | | | | |
|---|---|---|---|---|
| 1,549,770 A | * | 8/1925 | Holmes | F16J 13/02 137/377 |
| 1,593,041 A | * | 7/1926 | Stewart | F16L 23/036 292/256.73 |
| 2,749,945 A | * | 6/1956 | Kaiser | F16L 55/115 138/90 |
| 2,873,764 A | * | 2/1959 | Lombard | G01M 3/022 138/90 |
| 2,999,515 A | * | 9/1961 | Watson | F16L 55/172 285/373 |
| 3,963,054 A | * | 6/1976 | Martin | F16L 55/10 138/89 |
| 3,999,379 A | * | 12/1976 | LeFebvre | F02K 9/92 102/378 |
| 5,738,285 A | * | 4/1998 | Anderson | F16L 55/1141 222/545 |

(Continued)

*Primary Examiner* — Robert K Arundale
*Assistant Examiner* — Richard K. Durden
(74) *Attorney, Agent, or Firm* — Osha Bergman Watanabe & Burton LLP

(57) ABSTRACT

A temporary trap door cap device for sealing around a pressure-leaking trap door at an end of a pipeline terminating in a trap includes a canister formed from a longitudinally extending pipe having an open end and a closed end; and an annular rim connected to the open end, with an inner diameter smaller than an inner diameter of the canister. The annular rim is configured such that the inner diameter of the annular rim fits over the trap door of the trap terminating the pipeline. After the annular rim has passed over the trap door, the inner diameter of the annular rim is compressible against a body of the trap terminating the pipeline so as to seal an inner volume of the canister pressure-tight thereby containing the trap door within the pressure-tight volume.

13 Claims, 5 Drawing Sheets

Trap and Trap Door – Map View Through Central Plane

(56) References Cited

U.S. PATENT DOCUMENTS

| | | | | |
|---|---|---|---|---|
| 5,850,854 A | * | 12/1998 | Carroll | F16L 55/115 |
| | | | | 138/158 |
| 6,742,550 B2 | * | 6/2004 | Caparros | F17C 13/123 |
| | | | | 141/311 A |
| 2010/0186484 A1 | * | 7/2010 | Carson | G01M 3/2884 |
| | | | | 277/625 |
| 2019/0316725 A1 | * | 10/2019 | McGarian | F16L 21/04 |
| 2024/0151341 A1 | * | 5/2024 | Lemke | F16L 55/1157 |

\* cited by examiner

Trap and Trap Door on a Pipeline

An Embodiment of the Temporary Trap Door Cap

An Example of the Installation a Temporary
Trap Door Cap, According to One Embodiment Trap and Trap Door – Map View Through Central Plane Clamp Shell Flange End Elevation in Plane AA

TEMPORARY TRAP DOOR CAP

RELATED APPLICATIONS

This Application is a Division of application Ser. No. 17/016,892 filed on Sep. 10, 2020. The entire contents of this application is incorporated herein by reference in their entirety.

BACKGROUND

In the operation and maintaining of a pipeline, whether used in the oil and gas industry, in municipal water-supply systems, or for other purposes, it is frequently necessary to access the interior of the pipeline. Access may be needed to inspect the pipeline and repair, replace or hydraulically isolate damaged sections. One method of accessing the interior of a pipeline for these purposes is to insert one, or more, mechanical devices known as "pigs" into the pipeline. These pigs may carry sensors for inspecting the interior of the pipeline. Additionally, or alternatively, they may carry devices for repairing the interior of the pipeline. In other situations, the pigs may be capable of expanding on command to hydraulically block the pipeline.

The pigs may be introduced into the pipeline through a device known as a "pig trap" or simply a "trap." FIG. 1 depicts an example of a trap (100). The trap comprises one or more hydraulic isolation valves (102) that connect the trap to the pipeline (104) at one end, and to the narrow end of a truncated tapered cylinder (106) at the other end. The hydraulic isolation valve is intended to hydraulically isolate the trap from the body of the trap (108) when closed.

The broad end of the truncated tapered cylinder (106) connects to one end of the body of the trap (108). The other end of the body of the trap is closed with a trap door (110). The trap door (110) may be connected to the body of the trap (108) with a mechanism for supporting the trap door opened (112). In some situations, the mechanism for supporting the trap door when open may be a hinge mechanism. In addition, the trap door (110) may additionally comprise a clasp mechanism for securing the trap door. When closed and secured the trap door in intended to contain pressure within the pipeline and prevent fluid in the pipeline from leaking to the exterior of the trap. Further, additional conduits (116) may be attached to the body of the trap to selectably drain the trap when the hydraulic isolation valve (102) is closed.

In some situations, the pig may be introduced into the pipeline through the trap (100) by first closing the hydraulic isolation valve (102). The trap may then be drained using the draining conduits (116) and the trap door (110) opened by unfastening the clasp (114) and swinging the trap door (110) open. The trap door is held by supporting mechanisms (112). The pig may then be inserted into the body of the trap (108) and the trap door (110) closed and secured with the clasp (114). The hydraulic isolation valve (102) may then be opened to establish an open conduit to the pipeline (104) and allow passage of the pig into the pipeline (104).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to an apparatus for temporarily preventing, or containing, a leaking trap door until permanent remediation measures have been planned, scheduled, and executed are described. One embodiment is described that comprises a canister that fits over the trap door and seals around the body of the trap sealing the trap door and a portion of the body of the trap in a pressure-tight manner. This pressure-tight enclosure prevents the fluid leaking from the trap door from escaping into the environment. In some embodiments, one, or more, valves are mounted on the canister to allow the leaked fluid contained within the canister to drain in a controlled manner into a conduit. One or more methods are disclosed for installing and operating the temporary trap door cap over the trap door.

In general, in one aspect, embodiments relate to a temporary trap door cap device for sealing around a pressure-leaking trap door at an end of a pipeline terminating in a trap, comprising: a canister formed from a longitudinally extending pipe having an open end and a closed end; an annular rim connected to the open end, with an inner diameter smaller than an inner diameter of the canister, wherein the annular rim is configured such that the inner diameter of the annular rim fits over the trap door of the trap terminating the pipeline, and wherein, after the annular rim has passed over the trap door, the inner diameter of the annular rim is compressible against a body of the trap terminating the pipeline so as to seal an inner volume of the canister pressure-tight thereby containing the trap door within the pressure-tight volume.

In general, in one aspect, embodiments relate to a temporary trap door cap device for sealing around a pressure-leaking trap door at an end of a pipeline terminating in a trap, the device comprising: a canister with a longitudinally extending pipe having an open end and a closed end; a first flange connected to the open end; a clamshell clamp removably clampable to a body of the trap, wherein the clamshell clamp comprises: a cylinder divided into two halves along a plane containing the longitudinal axis of the cylinder, each half having a connecting surface along both longitudinal edges for connecting to the connecting surfaces on the other half such that the clamshell clamp is compressible against a body of the trap terminating the pipeline, and a second flange connected to one end of each half so as to be connectable with the first flange of the canister; and a fastener for removably connecting the first flange to the second flange.

In general, in one aspect, embodiments relate to a method of temporarily sealing around a pressure-leaking trap door at an end of a pipeline terminating in a trap, comprising: fitting a canister over the trap door of the trap terminating the pipeline, wherein the canister is formed from a longitudinally extending pipe having an open end and a closed end, and wherein the canister comprises an annular rim connected to the open end, after the canister has passed over the trap door, compressing the annular rim against a body of the trap terminating the pipeline so as to seal an inner volume of the canister pressure-tight thereby containing the trap door within the pressure-tight volume.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In some cases in which a trap is employed on a pipeline, the effectiveness of the seal between the trap door (110) and the body of the trap (108) and the effectiveness of the hydraulic isolation valve (102) may become compromised, allowing the contents of the pipeline to leak into the exterior environment. This leaking oil or gas may pose a significant environmental hazard in the vicinity of the trap. In addition, the leak may pose a significant safety hazard, as both oil and gas are highly flammable. Thus, it is often desirable to have access to an apparatus, and a method to use the apparatus, to temporarily prevent or contain such a leak until permanent remediation measures can be planned, scheduled, and executed.

Figure 1:
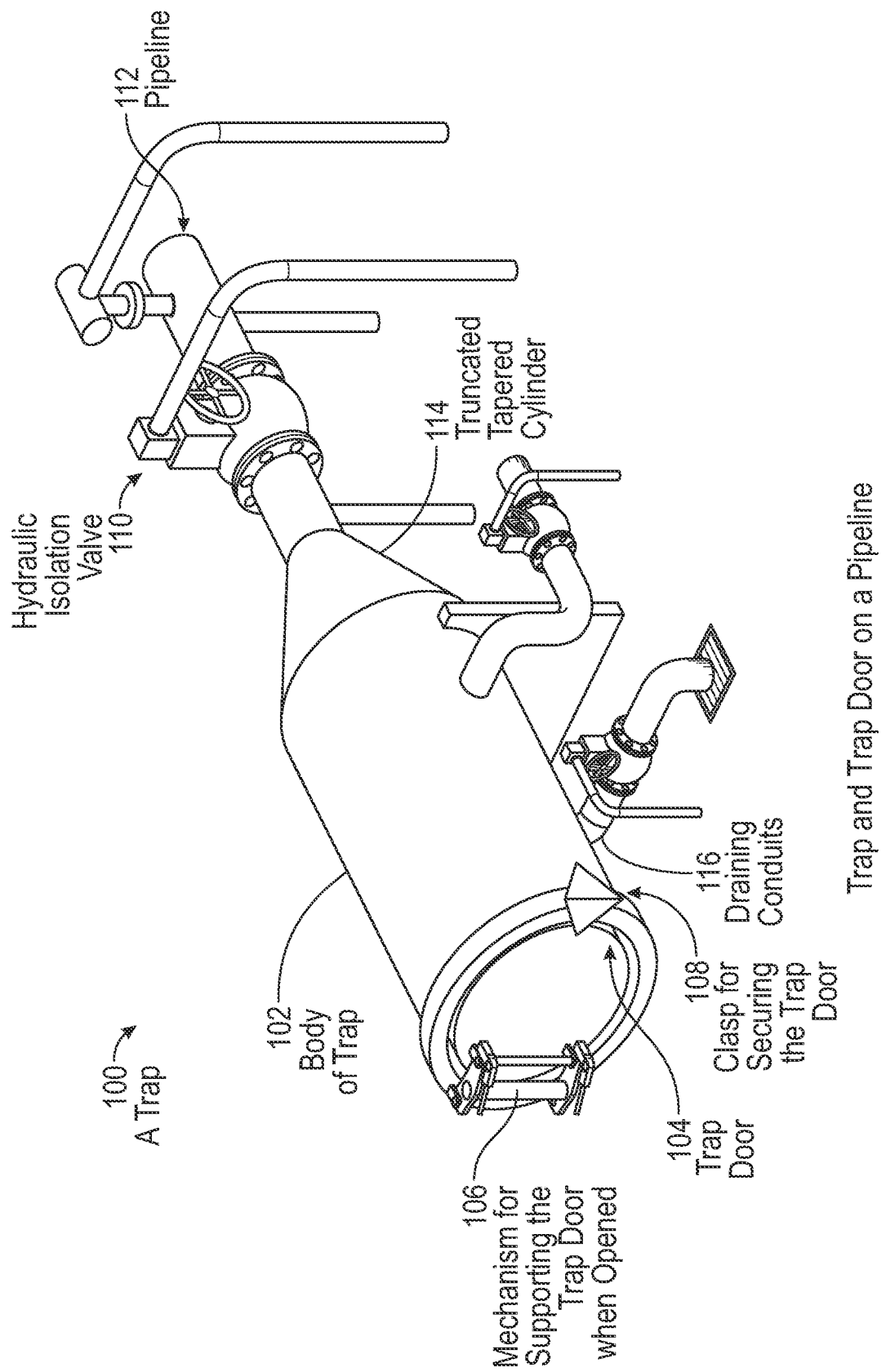
FIG. 1 shows a trap and trap door.
Figure 2:
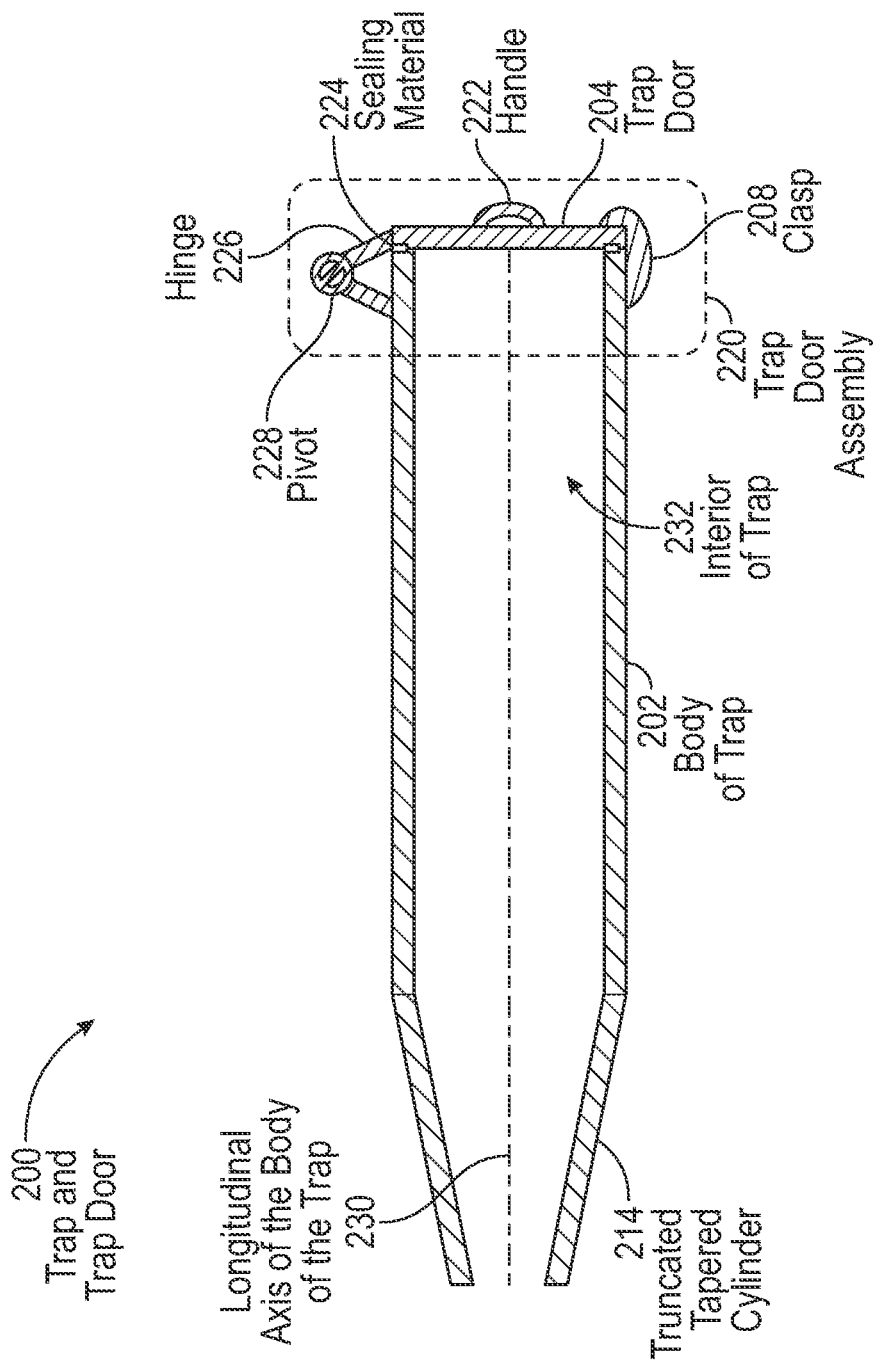
FIG. 2 shows a map view of some aspects of a trap and trap door.

FIG. 2 depicts a side elevation of a trap and trap door in a plane containing the longitudinal axis of the trap (200). The body of the trap (202) comprises a cylindrical canister connected at one end to a truncated tapered cylinder. The other end of the trap is terminated by a trap door assembly (204). The trap door assembly may comprise a trap door (206) which may have a handle (208) to facilitate opening and closing the trap door. Additionally, the trap door may be attached to the body of the trap with a hinge (210) and pivot (212) assembly that may support the trap door when open, and when opening and closing. Further, a clasp (214) may be attached to the trap door to securely hold the trap closed. The trap door assembly (204) may additionally comprise a sealing material (216) to seal the interior of the trap (218) pressure-tight when the trap door is closed. This seal may take the form of an o-ring composed of an elastomer material.

As FIG. 2 illustrates, in some embodiments, the elements of the trap door assembly (204) extend in a lateral direction beyond the external radius of the trap body. In particular, the hinge (210), pivot (212) and clasp (214) may be located wholly, or in part, further from the axis of the body of the trap (220) than the external radius of the body of the trap.

Figure 3:
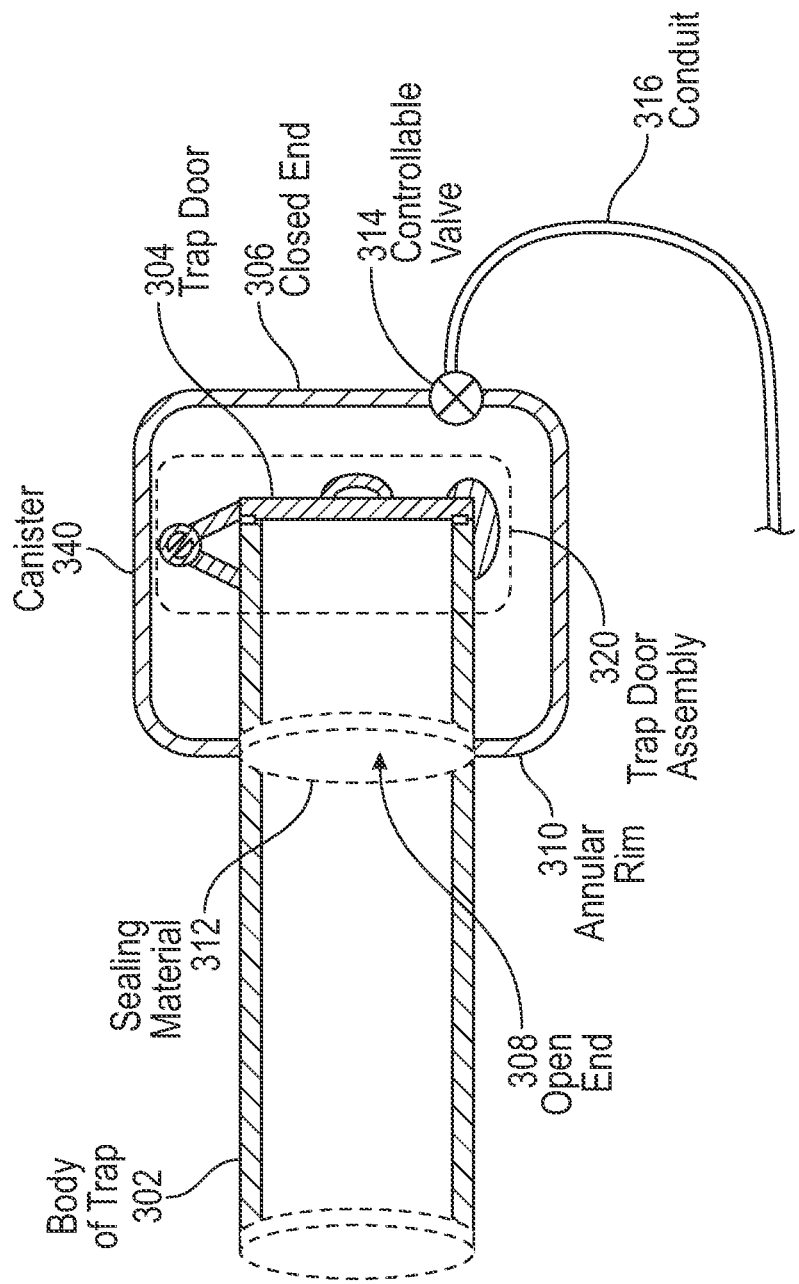
FIG. 3 shows an embodiment of a trap, trap door and temporary trap door cap.

FIG. 3 illustrates one embodiment of the temporary trap door cap. It comprises an essentially cylindrical canister (302) with a closed end and an open end (306). The lateral dimension of the canister is large enough at least in some locations to enclose the trap door assembly (316). In some embodiments, the open end (306) may have an annular rim (308) which may be compressed against the body of the trap (310) to form a pressure-tight seal. In some embodiments, the annular rim may be coated, or partially coated, with a sealing material to ensure the enclosed volume is pressure-tight.

The sealing material (312) that may coat the surface of the annular rim (308) that compresses against the body of the trap (310) may be an elastomer material attached in a non-transitory manner to the annular rim. Alternatively, a sealing material may be applied to the annular rim, or to the body of the trap, during the installation of the temporary trap door cap. The sealing material may also be an adhesive compound that applied to the annular rim, or to the body of the trap where the annular rim is compressed against the body of the trap.

The annular rim (308) may be compressed against the body of the trap (310) in any number of ways familiar to one skilled in the art. For example, the compressing may occur because the elastic properties of the material from which the canister (302), or from which the annular rim (306), is constructed cause it to contract on to the body of the trap (310) when it is not stretched with an external force. Alternatively, the compressing may be effected using a tape, or strap, or band, around the annular ring (306) and the body of the trap (310) and tightened by any number of methods familiar to one skilled in the art.

In one embodiment, one or more of the elements comprising the temporary trap door cap including, without limitation, the canister (302), the annular rim (308), and the closed end (304) may be constructed from an elastic material. The elastic material may be deformed by the application of external forces and returns to its original shape when the external forces are relaxed. In this embodiment, the temporary trap door cap may be installed by applying external forces to deform the temporary trap door cap; sliding the temporary trap door cap over the trap door assembly (316) and positioning the temporary trap door cap to enclose the trap door (318) and the trap door assembly (316); then relaxing the external forces to allow the annular rim (308) to compress around the body of the trap (310).

Additionally, in some embodiments, a controllable valve (314) may be mounted on the wall of the canister to allow fluid to flow in a controlled manner from within the temporary trap door cap into an attached conduit (316) or into the surrounding environment. The attached conduit may lead to temporary storage tanks, which may be static or mobile in nature. Alternatively, the conduit may lead to the pipeline and be attached to the pipeline with at least one controllable valve. Further, the conduit may be attached to one or more pumps and these pumps attached to storage tanks, or to the pipeline. In some embodiments, this combination of conduit, pump, and valves is intended to facilitate the draining of the pressure-tight volume encapsulating the trap door assembly, or to facilitate the reduction of pressure within the pressure-tight volume encapsulating the trap door assembly.

Figure 4:
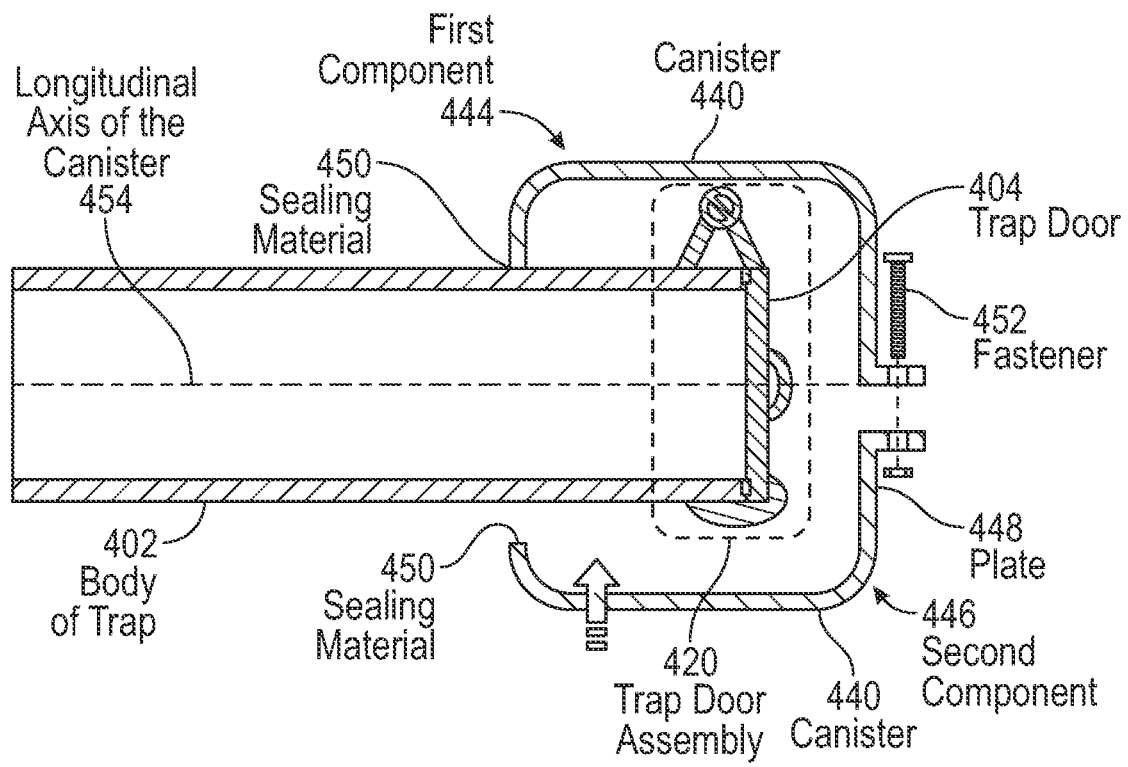
FIG. 4 shows an example of the installation a temporary trap door cap, according to one embodiment.

FIG. 4 shows another embodiment of the design and installation of the temporary trap door cap. In this example, the canister (402) is composed of a first component (402) and a second component (404) which, when connected together form a canister with a closed end, and an open end with an annular rim. In some embodiments, the two components are formed by dividing the temporary trap door cap along a plane containing the longitudinal axis of the cap (406) to produce two symmetrical components. In other embodiments, the first component (402) and the second component (404) may not be symmetrical.

Additionally, the first component (402) and the second component (404) may be equipped with a one or more fasteners (408) to securely connect the first component (402) to the second component (404). These fasteners may include screws, pins, bolts and nuts, rivets, clamps, clasps, hinges, bands, tapes, ropes, adhesive, glue, solder, or welds. This list is not intended to be exhaustive and one skilled in the art may easily identify other types of fasteners. In some embodiments, only one type of fastener may be used but, in other embodiments, a variety of different fastener types may be used in combination.

The embodiment depicted in FIG. 4 may be installed on a first side by placing the first component (402) over the trap door assembly (410) such that an annular rim of the first component (402) is in contact with the body of the trap (414). Additionally, the inner surface of the annular rim of the first component (402) may be coated, or partially coated, with a sealing material, such as an elastomer or adhesive, before the contact is established. Next, the second component (404) is installed on a second side, over the trap door assembly and positioned such that the annular rim of the second component (404) is in contact with the body of the trap (414).

Additionally, the inner surface of the annular rim of the second component (404) may be coated, or partially coated, with a sealing material such as an elastomer or adhesive before the contact is established. Furthermore, the surfaces of the first component (402) that will be placed in contact with the surfaces of second component (404) may be coated, or partially coated, with a sealing material such as an elastomer or adhesive before the contact between the first and second components is created. Similarly, the surfaces of the second component (402) that will be placed in contact with the surfaces of first component (404) may be coated, or partially coated, with a sealing material such as an elastomer or adhesive before the contact between the first and second components is created. Similarly, the surfaces of both components that will be placed in contact may be coated, or partially coated, with a sealing material such as an elastomer or adhesive before the contact between the first and second components is created.

The first component and the second component may be compressed against one another, and the annular rims of the first and second component may be compressed against the body of the trap (414) by tightening the fasteners provided for this purpose to create a pressure-tight seal enclosing the trap door assembly (410).

Figure 5A:
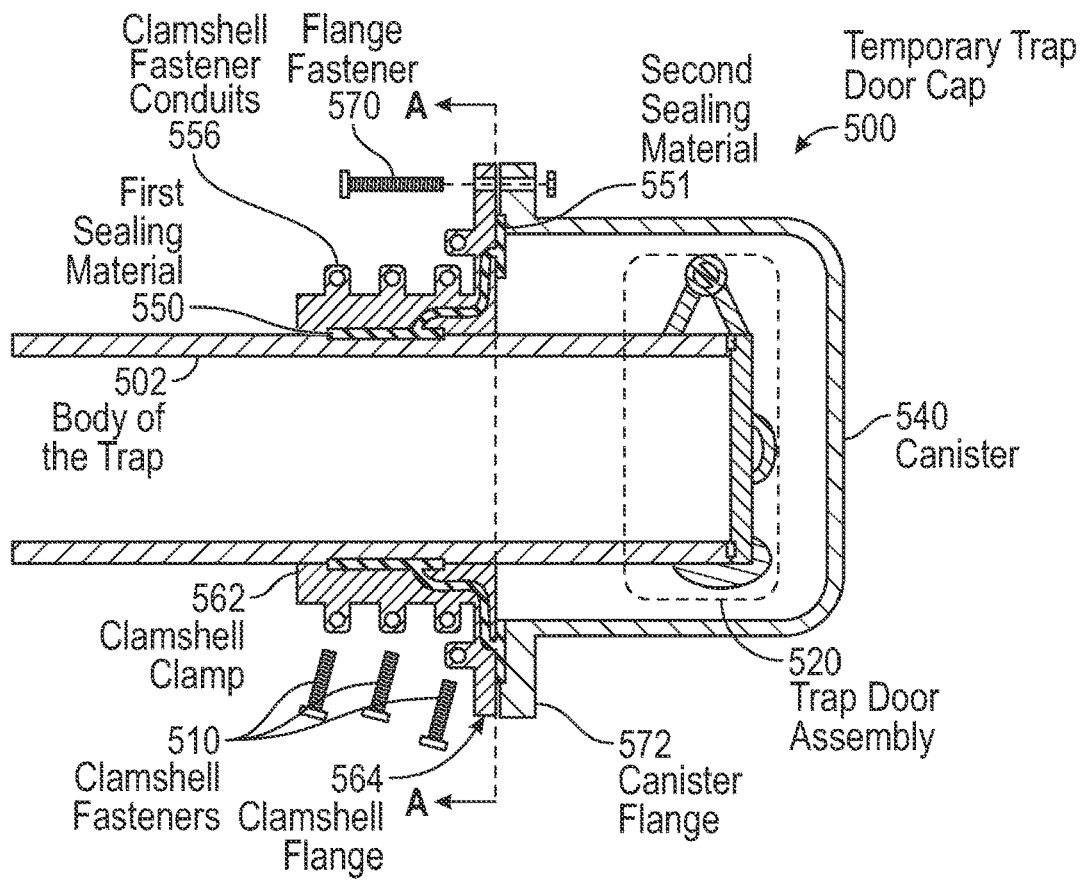
FIGS. 5A and 5B show an example of the installation a temporary trap door cap, according to another embodiment.
Figure 5B:
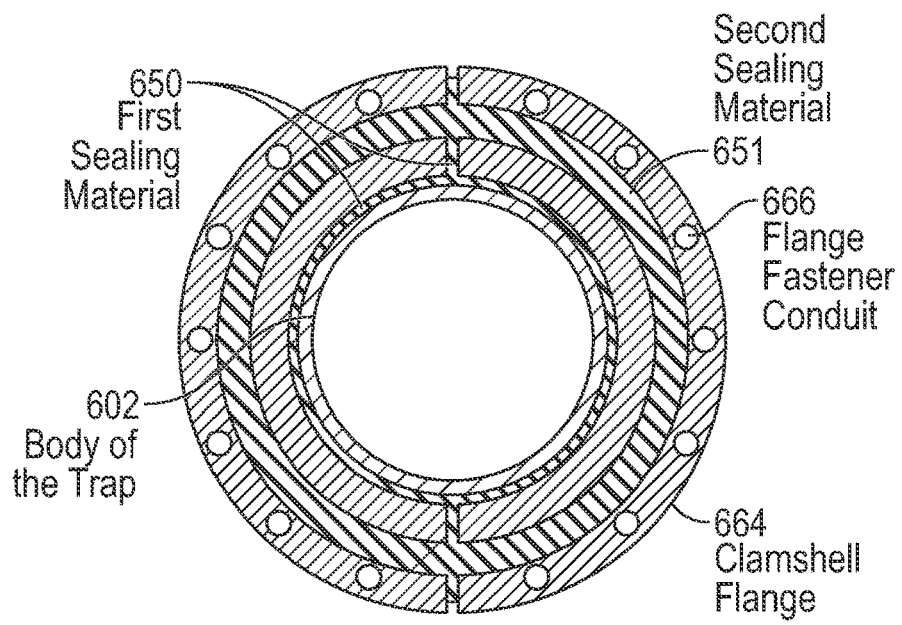

FIGS. 5A and 5B show another embodiment of a temporary trap door cap (500). This embodiment comprises a clamshell clamp (502) including a flange (504) that when installed extends laterally away from the body of the trap (506). The clamshell clamp may further comprise two essentially symmetric halves which when installed may be compressed against the body of the trap to firmly attach thereto. Further, in some embodiments, a first sealing material (508), such as an elastomer or an adhesive, may be introduced between the body of the clamp (506) and the clamshell clamp (502). The two essentially symmetric halves of the clamp may be compressed against the body of the trap using one or more clamshell fasteners (510), and in some cases clamshell fastener receptacles (512) to securely connect the first clamshell half to the second clamshell part. These fasteners may include screws, pins, bolts and nuts, rivets, clamps, clasps, hinges, bands, tapes, ropes, adhesive, glue, solder, or welds. This list is not intended to be exhaustive and one skilled in the art may easily identify other types of fasteners. In some embodiments, only one type of clamshell fastener may be used but, in other embodiments, a variety of different fastener types may be used in combination.

FIG. 5A further depicts a canister (514) with a closed end and a flange (516) at the open end. The canister may have a diameter that is sufficiently large that the canister (514) may fit over the trap door assembly (518) and the flange of the canister (516) may be brought into proximity to the clamshell flange (504). In some embodiments, a second sealing material (520) may coat, or partially coat, one or both of the canister flange and the clamshell flange. Alternatively, a second sealing material may be inserted between the canister flange (516) and the clamshell flange (504). In each embodiment described in this paragraph the canister flange (516) and the clamshell flange (504) may then be compressed together. One or more flange fasteners may be used to produce the compression. These flange fasteners may include screws, pins, bolts and nuts, rivets, clamps, clasps, hinges, bands, tapes, ropes, adhesive, glue, solder, or welds. This list is not intended to be exhaustive and one skilled in the art may easily identify other types of fasteners. In some embodiments, only one type of flange fastener may be used, but in other embodiments a variety of different fastener types may be used in combination.

FIG. 5B shows the embodiment displayed in FIG. 5A viewed from an orthogonal perspective. The view showed in FIG. 5B represents the cross-section indicated by the dashed line A-A in FIG. 5A.

FIG. 5B shows the body of the trap (506) surrounded by a first sealing material (508). This sealing material may extend to the faces of the two clamshell halves that are compressed into contact with one another. The face of the clamshell flange (504) may be coated, or partially coated, with a second sealing material (520). Further, the clamshell flange may be penetrated by flange fastener receptacle ("bolt holes") to receive the flange fasteners (514) shown in FIG. 5A that when tightened compress the clamshell flange and the canister flange together to form a pressure-tight seal.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method of temporarily sealing around a pressure-leaking trap door at an end of a pipeline terminating in a trap, wherein the trap comprises a trap body having a longitudinal axis and a trap door assembly disposed at an open end of the trap body, wherein the trap door assembly comprises a trap door arranged to selectively seal the open end of the trap body and a connection mechanism arranged to secure the trap door to the open end of the trap body, wherein the connection mechanism has a maximum external diameter that exceeds an external diameter of the trap body, comprising:

fitting a canister over the trap door of the trap terminating the pipeline, wherein the canister comprises a closed end and side walls extending from the closed end, and wherein the side walls and the closed end together define a cup-shaped body having an open end opposite the closed end and wherein an inner diameter of the canister exceeds the maximum external diameter of the connection mechanism;

compressing an annular rim to form a pressure-tight seal around a complete circumference of an exterior surface of the trap body at a longitudinal location of the trap body inward of the trap door, wherein a diameter of the annular rim at the longitudinal location is less than the inner diameter of the canister and wherein the exterior surface of the trap body at the longitudinal location is exposed when the trap door is closed; and forming a pressure-tight connection between the annular rim and the open end of the cup-shaped body;

wherein, when the canister is placed over the trap door assembly, the side walls, the closed end, the annular rim, and the pressure-tight connection together form a pressure-tight inner volume enclosing the trap door assembly within the canister.

2. The method of claim 1, wherein the annular rim is a deformable annular rim, and wherein the compressing comprises:

stretching the deformable annular rim of the canister to a diameter so as to fit the deformable annular rim over the trap door, and allowing the deformable annular rim to contract to an unstretched state thereby compressing the deformable annular rim against the trap body of the trap.

3. The method of claim 2 wherein the compressing comprises connecting two components separably connected to each other on a connecting surface located on a plane substantially extending in a longitudinal direction of the canister using a fastener, thereby compressing the deformable annular rim against the trap body.

4. The method of claim 2, wherein the deformable annular rim comprises an elastically deformable material.

5. The method of claim 1, wherein the annular rim comprises a clamshell clamp with a first flange, wherein the canister has a second flange; wherein the compressing comprises attaching the clamshell clamp to the trap body; wherein forming the pressure-tight connection comprises positioning the second flange adjacent to the first flange, and securing the first flange to the second flange with fasteners.

6. The method of claim 5, wherein the clamshell clamp is removably clampable to the exterior surface of the trap body at the longitudinal location.

7. The method of claim 5, wherein the clamshell clamp comprises a first clamshell part, a second clamshell part, and a fastener to selectively fasten the first clamshell part to the second clamshell part.

8. The method of claim 7, wherein the fastener to selectively fasten the first clamshell part to the second clamshell part comprises a plurality of bolts and wherein a tightness of the plurality of bolts controls a compression of the clamshell clamp.

9. The method of claim 5, wherein the first flange extends laterally from the clamshell clamp and the second flange is formed on the open end of the canister.

10. The method of claim 9, further comprising a sealing material disposed between the first flange and the second flange.

11. The method of claim 9, wherein the fasteners securing the first flange to the second flange comprise a plurality of bolts and wherein a tightness of the plurality of bolts controls a compression of the first flange to the second flange.

12. The method of claim 5, further comprising a sealing material disposed on a surface of the clamshell clamp that contacts the exterior surface of the trap body.

13. The method of claim 1 further comprising regulating pressure within the canister using a valve mounted on the canister that allows a controlled flow to exit the canister.

\* \* \* \* \*